(12) United States Patent
Barlow et al.

(10) Patent No.: US 11,537,757 B2
(45) Date of Patent: Dec. 27, 2022

(54) SECURELY WRITING DATA TO A SECURE DATA STORAGE DEVICE DURING RUNTIME

(71) Applicant: Hewlett-Packard Development Company, L.P., Houston, TX (US)

(72) Inventors: Dallas M Barlow, Tomball, TX (US); Stanley Hyojun Park, Houston, TX (US); Christopher H Stewart, Houston, TX (US); Baraneedharan Anbazhagan, Houston, TX (US); Scott B Marcak, Cypress, TX (US); Richard A Bramley, Jr., Mansfield, MA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 527 days.

(21) Appl. No.: 15/771,348

(22) PCT Filed: Feb. 19, 2016

(86) PCT No.: PCT/US2016/018727
§ 371 (c)(1),
(2) Date: May 1, 2018

(87) PCT Pub. No.: WO2017/142559
PCT Pub. Date: Aug. 24, 2017

(65) Prior Publication Data
US 2018/0373900 A1 Dec. 27, 2018

(51) Int. Cl.
*G06F 21/78* (2013.01)
*H04L 9/32* (2006.01)
*G06F 21/57* (2013.01)

(52) U.S. Cl.
CPC ............ *G06F 21/78* (2013.01); *H04L 9/3242* (2013.01); *G06F 21/572* (2013.01); *G06F 21/575* (2013.01)

(58) Field of Classification Search
CPC ...... G06F 21/78; G06F 21/572; G06F 21/575; H04L 9/3242
(Continued)

(56) References Cited

U.S. PATENT DOCUMENTS

| 7,546,447 B2 | 6/2009 | Chen et al. |
| 8,122,180 B2 | 2/2012 | Chieu et al. |

(Continued)

FOREIGN PATENT DOCUMENTS

| CN | 101281577 A | 10/2008 |
| CN | 101651538 A | 2/2010 |

OTHER PUBLICATIONS

Sehgal, V.K., "Embedded Controller Based Smart Card Access", Oct. 22-24, 2008.
(Continued)

*Primary Examiner* — Brandon Hoffman
*Assistant Examiner* — Nega Woldemariam
(74) *Attorney, Agent, or Firm* — Fabian VanCott

(57) ABSTRACT

A computer system includes an independent compute core; and an isolated secure data storage device to store data accessible only to the independent compute core. The independent compute core is to open an Application Program Interface (API) during runtime of the computer system in response to receiving a verified message containing secure data to be written to the secure data storage device.

20 Claims, 8 Drawing Sheets

(58) Field of Classification Search
USPC .......................................................... 726/27
See application file for complete search history.

(56) References Cited

U.S. PATENT DOCUMENTS

| | | | |
|---|---|---|---|
| 9,038,130 | B2 | 5/2015 | Gillen et al. |
| 9,152,428 | B2 | 10/2015 | Sarangshar |
| 2003/0037237 | A1 | 2/2003 | Abgrall et al. |
| 2003/0056107 | A1 | 3/2003 | Cammack et al. |
| 2005/0091522 | A1 | 4/2005 | Hearn et al. |
| 2005/0283660 | A1 | 12/2005 | McKeen et al. |
| 2006/0015749 | A1* | 1/2006 | Mittal ..................... G06F 21/60 713/190 |
| 2006/0212694 | A1 | 9/2006 | Koizumi |
| 2006/0282902 | A1* | 12/2006 | Matsushita ........... G06F 21/554 726/26 |
| 2008/0082824 | A1 | 4/2008 | Ibrahim et al. |
| 2008/0288762 | A1* | 11/2008 | Chen ..................... G06F 21/575 713/2 |
| 2011/0125980 | A1* | 5/2011 | Brunet .................. G06F 3/0605 711/162 |
| 2014/0004825 | A1* | 1/2014 | Prakash ................ H04W 12/06 455/411 |
| 2014/0223198 | A1 | 8/2014 | Saranghar et al. |
| 2015/0134974 | A1 | 5/2015 | Henry |
| 2015/0220319 | A1 | 8/2015 | Weiss et al. |
| 2015/0350206 | A1 | 12/2015 | Shin et al. |
| 2015/0355911 | A1* | 12/2015 | Bibb, Jr. ................ G06F 21/572 713/2 |

OTHER PUBLICATIONS

Hu Yueming, Parallel computer system architecture, Computer System Architecture, Oct. 31, 2007, pp. 224-225, Beihang University Press.

\* cited by examiner

SECURELY WRITING DATA TO A SECURE DATA STORAGE DEVICE DURING RUNTIME

BACKGROUND

Illicit attacks on computer systems, particularly via the Internet, are increasing in frequency and sophistication. The authors of such attacks may seek to access data for identify theft, to impersonate legitimate services in an ongoing way, to interrupt or deny service, or simply to wantonly damage data or hardware.

BRIEF DESCRIPTION OF THE DRAWINGS

The accompanying drawings illustrate various implementations of the principles described herein and are a part of the specification. The illustrated implementations are merely examples and do not limit the scope of the claims.

Throughout the drawings, identical reference numbers designate similar, but not necessarily identical, elements.

DETAILED DESCRIPTION

Figure 1:
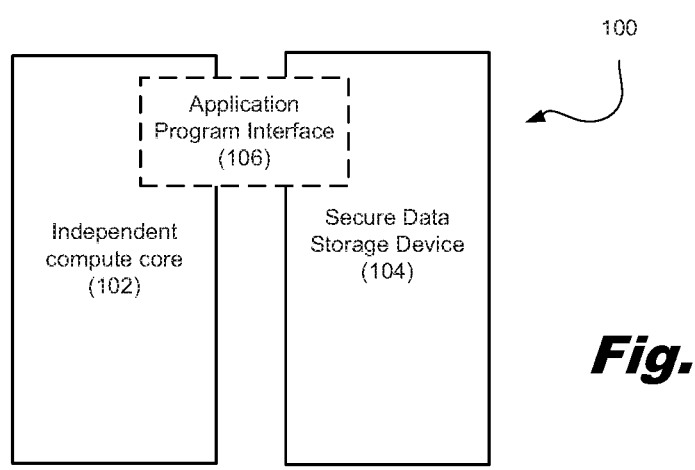
FIG. 1 is a diagram of an example independent compute core with an Application Program Interface (API), available during runtime, to a secure data storage device consistent with the disclosed implementations.

As noted above, illicit attacks on computer systems, particularly via the Internet, are increasing in frequency and sophistication. The authors of such attacks may seek to access data for identify theft, to impersonate legitimate services in an ongoing way, to interrupt or deny service, or simply to wantonly damage data or hardware.

One particular point for such attacks is a computer system's Basic Input Output System (BIOS). This is the firmware that allows a computer system to boot up prior to running an operating system (OS). Most user software then runs on the platform of the OS. The BIOS is stored in a dedicated memory, typically Serial Peripheral Interface (SPI) Flash memory, and is the first code executed by the central processing unit (CPU) on startup of the computer system. If the BIOS is successfully corrupted or changed, the source of the problem can be very difficult to locate and correct while the attacker may then have successfully compromised many aspects of the security and control of the computer system. Moreover, BIOS code typically executes at a higher level of privilege than even the most privileged OS code. Thus, attacks which undermine the BIOS can be very valuable to attackers.

The security of the BIOS is improved by a separate watchdog system. For this watchdog system, a dedicated chip or integrated circuit is provided on the system board of the computer system. This may be, for example, an independent compute core (EC) or a Super Input/Output (SIO) chip. For ease of reference, all the possible implementations of the watchdog system described herein will be referred to collectively as an "independent compute core."

Upon a startup or system wake, or whenever the BIOS is needed, the independent compute core will cryptographically verify that the BIOS is correct, meaning that the BIOS has not been corrupted or changed by any of a malicious attack, data degradation or other malfunction. If the independent compute core identifies any issues with the BIOS, the independent compute core can automatically repair the BIOS using a separate, secure backup copy of the BIOS. The secure copy of the BIOS and other secure data may be stored on a Serial Peripheral Interface (SPI) chip that is electrically isolated so as to be accessible only by the independent compute core. Such data storage that is electrically isolated so as to be accessible only by the independent compute core will be referred to herein and in the claims as "secure storage" or "secure memory." Data storage locations which are not accessible exclusively to an independent compute core will be referred to as "less secure" storage.

The backup copy of the BIOS and other secure data are accessed in secure storage by the independent compute core using a trusted Application Program Interface (API). This API includes an API flag that can be set to "closed" or "open" values. When this flag is set to "closed," the data accessed through the corresponding API cannot be altered and that secure storage location cannot be written to As a security precaution, any such API flags for APIs to secure data may be set to "closed" by the BIOS during a system boot. Runtime refers to the subsequent time after boot-up, such as when the operating system is executing. With the trusted API flags set to "closed" during boot-up and into runtime, secure data cannot be written during runtime to any of the secure storage accessible only to the independent compute core.

However, the BIOS may need to accept input during runtime to a secure storage location. This may occur if, for example, an update to the backup copy of the BIOS needs to be recorded or other secure data needs to be stored or updated. Where this is the case, the BIOS will save the update data temporarily to a less secure location, such as Non-Volatile Random Access Memory (NVRAM). The BIOS will then reboot the system to open the flag for the trusted API. Once the trusted API is open, the data to be secured can be written to secure storage using the independent compute core, which has the exclusive access to that secure storage location. Once the secure data is written, the trusted API is again closed prior to system runtime. This process is then repeated the next time data needs to be written to the secure storage.

This approach creates a potential vulnerability due to the use of the less secure storage, such as NVRAM, as a temporary data storage location for the secure data. An attacker who learned of the proper format for the secure data might, under certain circumstances, successfully attack the NVRAM or other temporary data storage in order to alter the secure data waiting to be transferred to the secure storage managed exclusively by the independent compute core. This, in turn, could lead to an erroneous or malicious change to the data in the secure storage. Such an attack on the less secure storage, such as NVRAM, is much simpler than trying to defeat a trusted API to access the secure storage more directly.

Accordingly, to avoid the need to store secure data temporarily in a less secure storage location, the present specification describes a secure mechanism for allowing communication during runtime to the secure storage location accessed exclusively by the independent compute core. Consequently, such secure data need not be held in a less secure location, such as NVRAM, where it is more vulnerable to attack, while waiting for a reboot and for the trusted API to be open.

As used herein and in the following claims, the term "independent compute core" is used to refer to a chip, integrated circuit or other any other device that includes a processor that is a separate entity from the main system processor(s) to control exclusive access to secure data storage and to verify BIOS firmware prior to use of the BIOS firmware in booting a corresponding computer system. An independent compute core may be, for example, a separate independent compute core or a super Input/Output (SIO) chip on a system board of a computer system.

As used herein and in the following claims, the terms "secure data storage device," "secure storage" or "secure memory" will refer to a data storage device or locations on such a device that is electrically isolated so as to be accessible only by an independent compute core. Other data storage devices and locations which are not accessible exclusively to an independent compute core will be referred to as "less secure" storage.

In one example, the present specification describes a computer system including an independent compute core; and an isolated secure data storage device to store data accessible only to the independent compute core. The independent compute core is to open an Application Program Interface (API) during runtime of the computer system in response to receiving a verified message containing secure data to be written to the secure data storage device.

In another example, the present specification describes a method including, during runtime of a computer system, opening an Application Program Interface (API) with an independent compute core in response to receiving a verified message containing secure data to be written to a secure data storage device; and writing the secure data to the secure data storage device through the API.

In still another example, the present specification describes a non-transitory computer-readable medium comprising instructions that, when executed by an independent compute core of a computer system, cause the independent compute core to: upon receipt of a message, verify the message; in response to verification of the message, during runtime of the computer system, open an Application Program Interface (API); and write secure data from the message, after verification, through the API to a secure data storage device that is logically accessible only to the independent compute core.

In the following description, for purposes of explanation, specific details are set forth in order to provide a thorough understanding of the disclosure. It will be apparent, however, to one skilled in the art that examples consistent with the present disclosure may be practiced without these specific details. Reference in the specification to "an implementation," "an example" or similar language means that a particular feature, structure, or characteristic described in connection with the implementation or example is included in at least that one implementation, but not necessarily in other implementations. The various instances of the phrase "in one implementation" or similar phrases in various places in the specification are not necessarily all referring to the same implementation.

FIG. 1 is a diagram of an example independent compute core with an Application Program Interface (API), available during runtime, to a secure data storage device consistent with the disclosed implementations. As shown in FIG. 1, the system (100) includes an independent compute core (102). As described above, this independent compute core (102) may be provided on the system board of a host computer system and may be used to increase the security of the computer system. Specifically, the computer system (100) includes a secure data storage device (104) on which to store secure data the integrity of which safeguards the operation of the host computer system and protects the data and identify of the system's user. For example, this secure data may include a backup copy (116) of the BIOS firmware for the host computer system.

To ensure the security of the data on the secure data storage device (104), the secure data storage device (104) may be electrically isolated from other components of the host computer system except for the independent compute core (102). Consequently, the independent compute core (102) has exclusive access to the data on the secure data storage device. As will be described below, a mechanism is proposed to allow the independent compute core (102) to receive and verify data to be written to the secure data storage device (104) even during runtime of the computer system (100).

An Application Program Interface (API) controlled by the independent compute core (102) is used by the independent compute core to access the data on the secure data storage device (104). As will be further described below, each such API includes a flag that can be set to an open or closed state. In the closed state, the API does not permit write access to corresponding data on the secure data storage device.

As used herein and in the appended claims, to open or close an API refers to changing the state of the API flag to open or closed to as to permit or preclude write access to the corresponding data on the secure data storage device.

Figure 2:
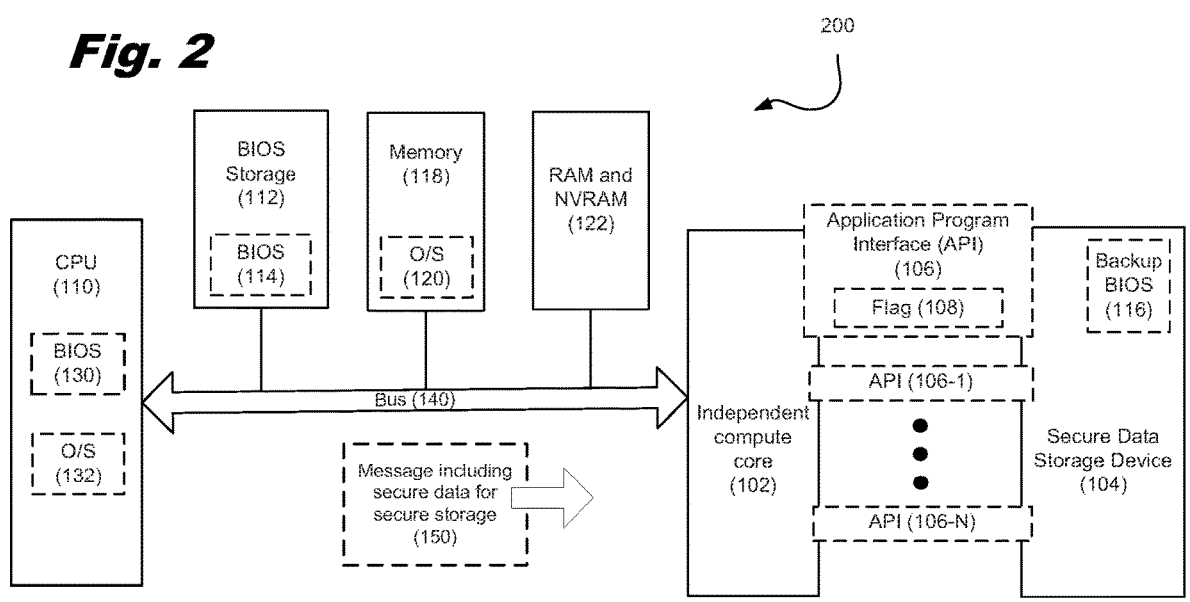
FIG. 2 is a diagram of an example computer system including an independent compute core with a number of Application Program Interfaces (APIs) to a secure data storage device consistent with the disclosed implementations.

FIG. 2 is a diagram of an example computer system including an independent compute core with a number of Application Program Interfaces (APIs) to a secure data storage device consistent with the disclosed implementations. As shown in FIG. 2, the computer system (200) includes a Central Processing Unit (CPU) (110) with supporting memory units. These may include a main memory device (118), such as a hard drive or solid state drive, along with Random Access Memory (RAM) and non-volatile NVRAM (122). As shown in FIG. 2, the main memory device (118) stores the Operating System (O/S) (120).

During startup, the CPU will execute the BIOS firmware (114) from the BIOS storage (112). Thus, an instantiated version of the BIOS (130) is shown associated with the CPU (110). At runtime, the O/S will be instantiated from the memory (118) by the CPU (110). Thus, an instantiated version of the O/S (132) is also shown in association with the CPU (110).

A bus (140) provides communication between the CPU (110), the storage devices (112, 118 and 122) and the independent compute core (102). As described above, the secure state storage device (104) is electrically isolated from the other system (200) components and is only accessible to the independent compute core (102). As also mentioned above, the secure data storage device (104) may contain a backup BIOS image (116) with which the independent compute core (102) can repair or replace the BIOS image (114) in the BIOS storage (112) prior to boot.

As also described previously above, the independent compute core (102) controls an Application Program Interface (API) (106) used to control write access to the data stored on the secure data storage device (104). This API includes a flag (108) that can be set to a closed or open state, as described above. As also shown in FIG. 2, there may be a number of APIs (106-1-106-N). Each API (106) may provide access to specific data or locations on the secure data storage device. Thus, only specific data can be rendered accessible by flagging open a corresponding API (106), while the other APIs remain flagged as closed.

Lastly, as shown in FIG. 2, during runtime, a message (150) may be prepared at the CPU (110) that includes secure data that needs to be stored in the secure data device (104). This message (150) is sent to the independent compute core (102). This message may be sent through a number of channels including storing the message (150) in a memory unit, such as NVRAM (122), that is accessible to both the CPU (110) and the independent compute core (102).

Figure 3:
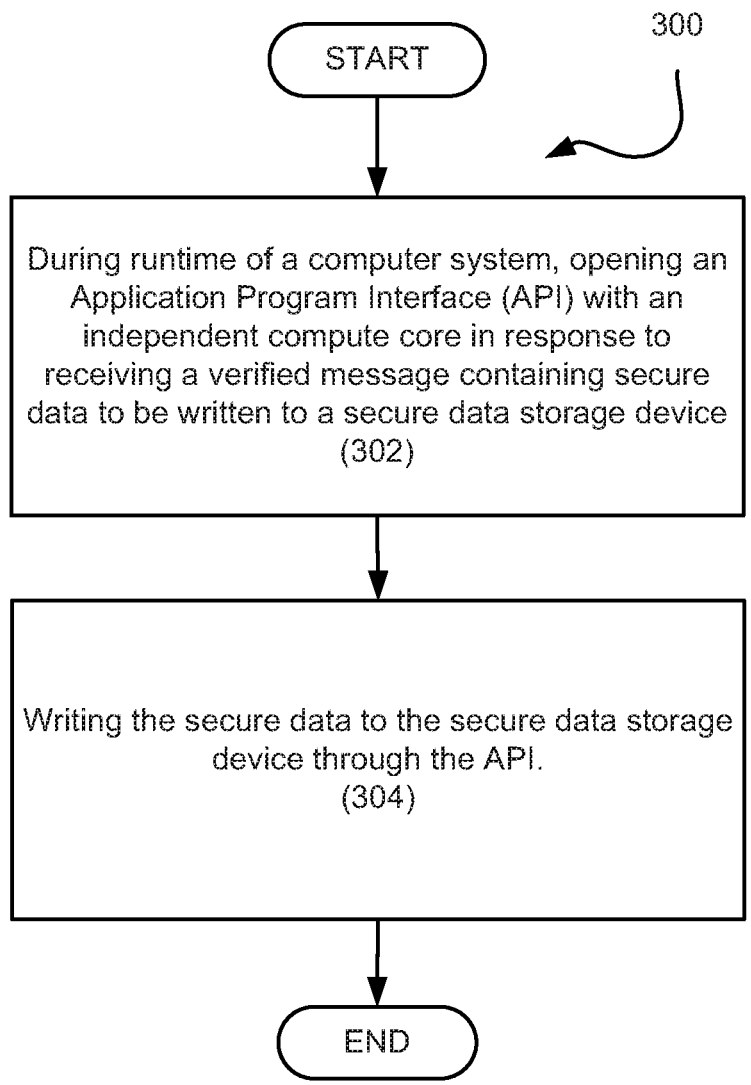
FIG. 3 is a flowchart of an example method of using an independent compute core with an Application Program Interface (API) to a secure data storage device to write data during runtime to the secure data storage device consistent with the disclosed implementations.

FIG. 3 is a flowchart of an example method of using an independent compute core with an Application Program Interface (API) to a secure data storage device to write data during runtime to the secure data storage device consistent with the disclosed implementations. As shown in FIG. 3, the method includes, during runtime of a computer system, opening (302) an Application Program Interface (API) with an independent compute core in response to receiving a verified message containing secure data to be written to a secure data storage device; and writing (304) the secure data to the secure data storage device through the API.

Figure 4:
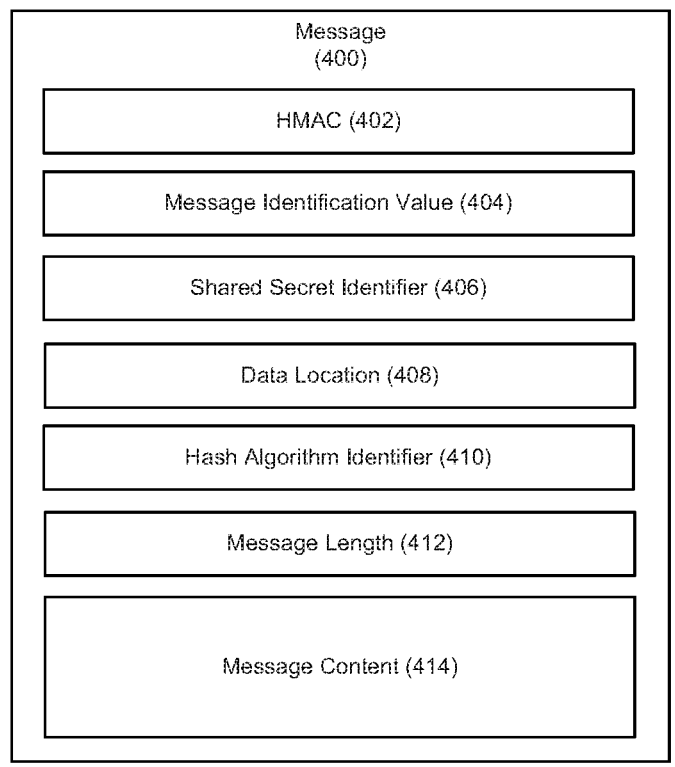
FIG. 4 is a diagram of an example message for writing data during runtime to the secure data storage device consistent with the disclosed implementations.

FIG. 4 is a diagram of an example message for writing data during runtime to the secure data storage device consistent with the disclosed implementations. As shown in FIG. 4, the message (400) includes at least seven fields.

The first field is a keyed-hash message authentication code (HMAC) (402). An HMAC is a specific construction for calculating a message authentication code (MAC) involving a cryptographic hash function in combination with a secret cryptographic key. In this case, the digest is a hash of certain other fields of the message (400) using a shared secret shared between the BIOS (130, FIG. 2) and the independent compute core (102, FIG. 2) as the hash key. Specifically, the digest (402) is a hash of the values from all the other fields in the message (400). All fields are incorporated into the digest (402) because doing so allows for every field to be verified by the HMAC.

The hash algorithm used to create the HMAC (402) is arbitrary and can be any hash algorithm using a cryptographic key. A record of what hash algorithm is used is kept in the hash algorithm identifier field (410).

For example, the HMAC digest field (402) itself may be set to 64 bytes long, which is long enough to accept any SHA-2 or SHA-3 HMAC digest length except for SHA-3 SHAKE128 and SHAKE256. Thus, the HMAC Digest allows for the flexibility of using any approved hash algorithm when generating the digest (402). The length of the actual HMAC need not be tracked because the lengths of all supported digests are fixed based on the specific hash algorithm.

The second field is the Message Identification Value (404). This is a unique number that identifies each individual message. Every valid input message sent using an insecure data channel will contain a Message Identification Value that exactly matches the current Message Identification Value that is expected by independent compute core. Once a Message Identification Value has been used, this Identification Value is incremented by one. Since each message contains a unique Message Identification Value, this field mitigates against replay attacks through the insecure channel.

Each time the system boots, the current Message Identification Value is retrieved by the BIOS (130, FIG. 2) from the independent compute core (102, FIG. 2) prior to closing the trusted API which secures that data for the transition to runtime. The BIOS then stores the current Message Identification Value, for example in System Management RAM (SMRAM) or in the Trusted Platform Module (TPM) Hierarchy, depending on the capabilities and configuration of the system.

Thereafter, the independent compute core and BIOS separately increment the Message Identification Value after sending/receiving each secure message (400) during runtime. Since both start at the same Message Identification Value, independent increment of the Message Identification Value helps ensure the authenticity of each message (400). Since the Message Identification Value is re-synchronized after every boot, any unexpected lack of Message Identification Value synchronicity can be recovered at the system reboot. This allows for the system to recover from unexpected errors while still maintaining the security and integrity of the overall messaging system.

The third field (406) is Shared Secret Identifier. This identifier (406) is an ordinal that identifies the particular shared secret used for the HMAC. This identifier assists in cases where the BIOS shares multiple secrets with independent compute core. An entity which knows the Shared Secret can be permitted to write data to fields controlled by a Trusted API even when that Trusted API is set to closed.

The fourth field (408) is Data Location. This value acts as a subcommand for the overall message, thereby allowing the BIOS to tell the independent compute core what sort of data is contained in the message. The independent compute core can thus write the data to the appropriate location in the secure data storage device (104, FIG. 2) based on the Data Location field.

The fifth field (410) is the Hash Algorithm Identifier. Each supported hash algorithm, such as the SHA-2 algorithm and SHA-3 algorithm, corresponds to a unique value in this field. Thus, any hash algorithm can be specified for use in generating the HMAC (402) using this field (410).

The sixth field (412) is Message Length. This allows for messages of arbitrary length to be sent securely at runtime from the BIOS to the independent compute core. In some implementations, the message length is capped at some arbitrary value to prevent denial of service attacks from attempting to send very large messages to the independent compute core.

The seventh field (414) is the actual message content. The message length (412) may specify the length of this content (414) in bytes. The message content can be any data without restriction that is to be held in the secure data storage device (104, FIG. 2). The sender of the message (400), presumably the BIOS (130, FIG. 2), should ensure that the message content (414) makes sense for the specified data location (408).

The independent compute core may or may not verify the value of the Message beyond verifying the integrity of the HMAC (402) which encapsulates the data of the message (400). Additional verification may be specific to a particular message or application.

Figure 5:
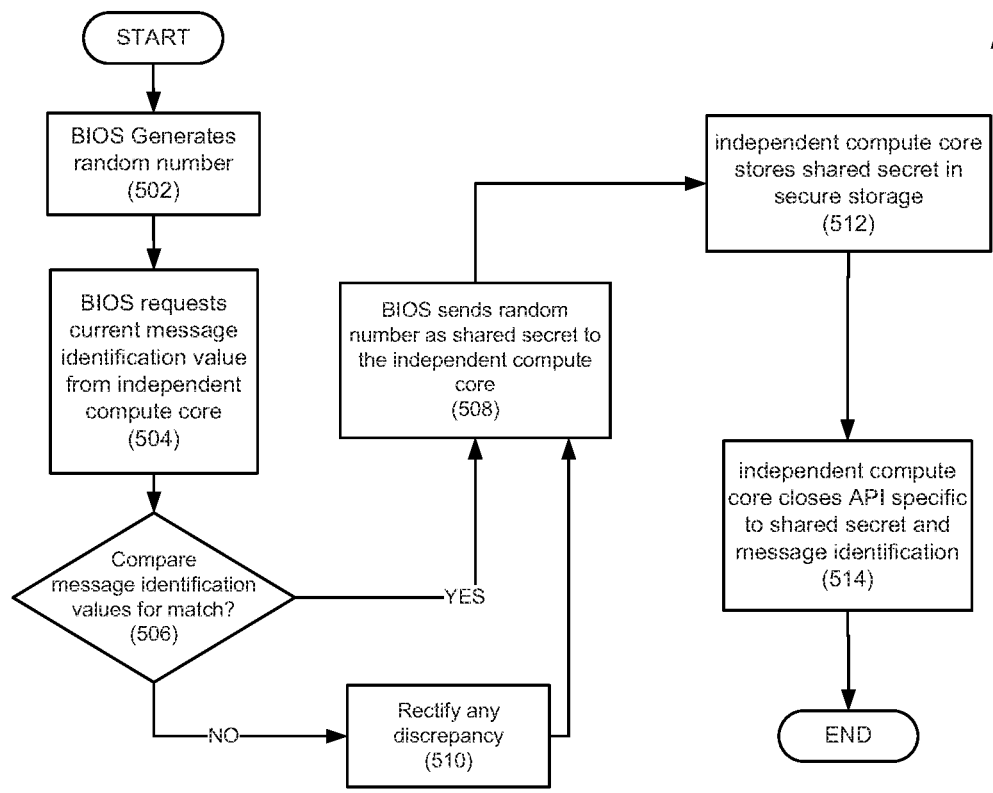
FIG. 5 is a flowchart showing an example method of establishing a shared secret between the BIOS of a host machine and an independent compute core for writing data, during runtime, to a secure data storage device consistent with the disclosed implementations.

FIG. 5 is a flowchart showing an example method of establishing a shared secret between the BIOS of a host machine and an independent compute core for writing data, during runtime, to a secure data storage device consistent with the disclosed implementations. As shown in FIG. 5, the BIOS (130, FIG. 2) will generate (502) a random number. The BIOS may use the TPM to generate this number or it may use system firmware or hardware to generate this random number. In any of these cases, the BIOS guarantees that the random number is cryptographically secure, which means that the random number has enough entropy associated with it that it is a reliable random number for cryptographic operations.

The BIOS then requests (504) a current message identification value from the independent compute core (102, FIG. 2). As described above, the independent compute core then provides its value for the current message identification. This value is compared (506) to the current message identification of the BIOS. If there is any discrepancy between the message identification values, it is rectified (510).

The BIOS then sends (508) the random number to the independent compute core. The random number is then used as the shared secret that is shared between the BIOS and the independent compute core. As described above, an ordinal identifying this random number as among other secrets shared between the BIOS and the independent compute core can be assigned, if needed. In some implementations, the independent compute core might generate the random number and provide that number to the BIOS, rather than the other way around. In such implementations, the BIOS is the recipient of the random number already known to, and stored by, the independent compute core. When the BIOS is the recipient, it stores this random number in SMRAM, just as when BIOS is the generator of the random number.

The independent compute core then stores (512) the shared secret in the secure data storage device (104, FIG. 2). The independent compute core then closes (514) the API that is specific to the shared secret. This API may be linked for access to both the shared secret and the message identification value in the secure data storage device (104, FIG. 2). Consequently, any subsequent requests to the independent compute core for the message identification value, which might be part of an attack, are ignored due to closure of that API.

Figure 6:
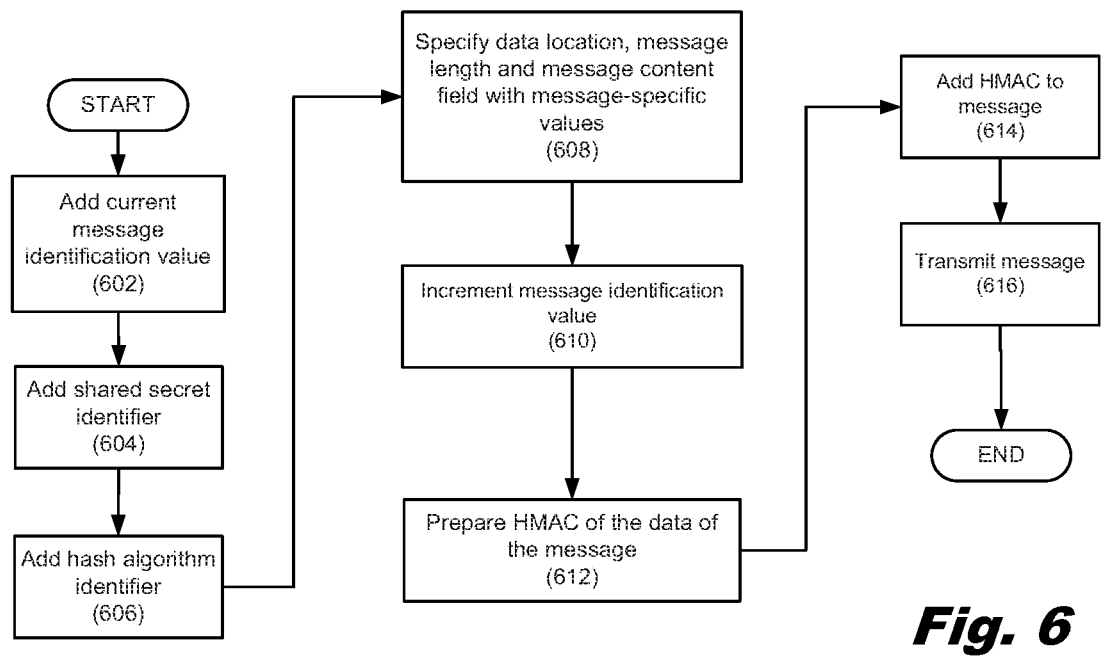
FIG. 6 is a flowchart showing an example method of preparing a message from the BIOS of a host machine to an independent compute core for writing data, during runtime, to a secure data storage device consistent with the disclosed implementations.

FIG. 6 is a flowchart showing an example method of preparing a message from the BIOS of a host machine to an independent compute core for writing data, during runtime, to a secure data storage device consistent with the disclosed implementations. As shown in FIG. 6, the BIOS (130, FIG. 2) builds a message using the format described above in the example of FIG. 4.

First, the BIOS adds (602) the current message identification value. The BIOS then adds (604) the shared secret identifier, if there are multiple secrets shared with the independent compute core. The BIOS then adds (606) the hash algorithm identifier to designate which of the available hash algorithms is to be used.

The BIOS then specifies (608) the data location, message length and message content fields with message-specific values. The BIOS will then also increment (610) its message identification value and prepare (612) the HMAC of the data of the message. The BIOS then adds (614) the HMAC to the message and transmits (616) the message.

Figure 7:
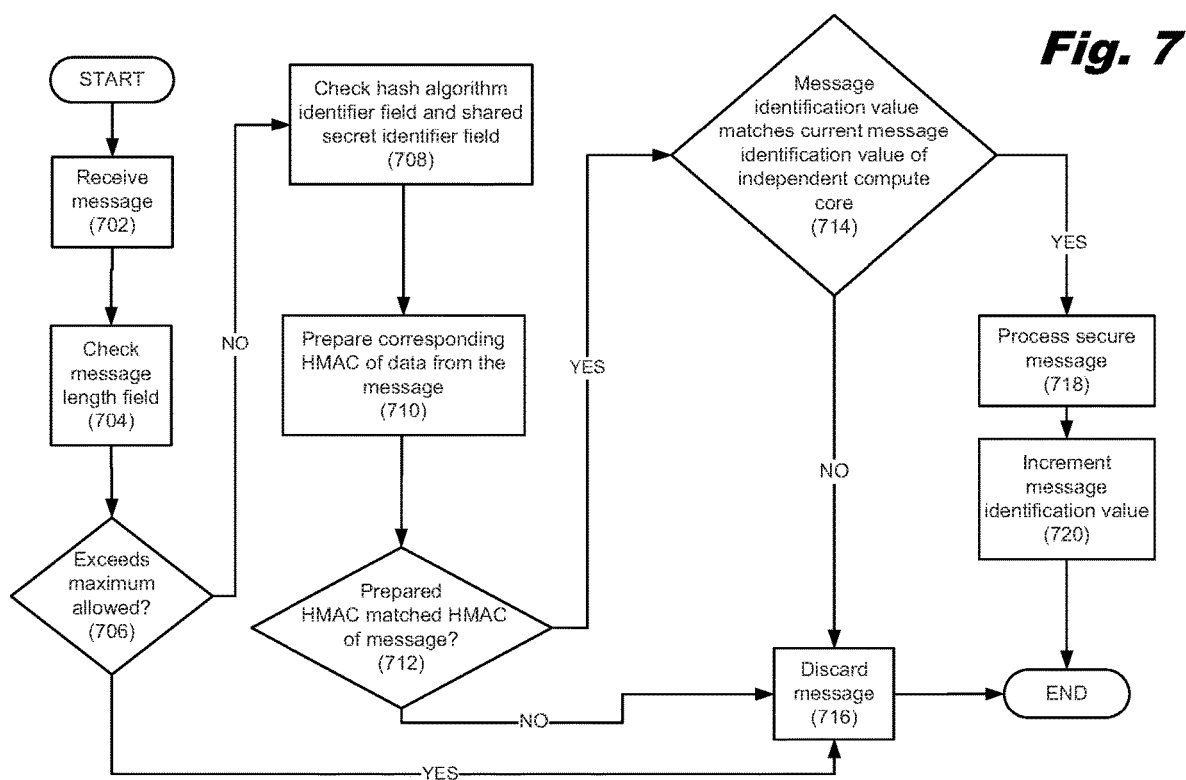
FIG. 7 is a flowchart showing an example method of verifying a message from the BIOS of a host machine to an independent compute core for writing data, during runtime, to a secure data storage device consistent with the disclosed implementations.

FIG. 7 is a flowchart showing an example method of verifying a message from the BIOS of a host machine to an independent compute core for writing data, during runtime, to a secure data storage device consistent with the disclosed implementations. As shown in FIG. 7, when the message is received (702) by the independent compute core (102, FIG. 2), the controller may begin by checking (704) the message length field. As described above, this can quickly identify overly large messages intended as a denial-of-service attack on the independent compute core. If the message length exceeds a maximum allowed (determination 706), the message is discarded (716).

If the message is of acceptable length, the independent compute core next checks (708) the hash algorithm identifier field and the shared secret identifier field. The independent compute core then accesses the indicated hash algorithm and shared secret.

The independent compute core then prepares (710) its own HMAC of the data of the message. In various examples, the HMAC may be of all or only selected fields from the message.

The independent compute core then determines (712) if this prepared HMAC matches the HMAC contained in the HMAC field (402, FIG. 4) of the message. If not, the message is not verified and is discarded (716). If the HMACs match, however, the message is verified and is processed (718). This operation, when successful, establishes that the independent compute core trusts the message sender, in this case, the BIOS. If this operation fails, the independent compute core assumes the message comes from an attacker and does not allow for further message processing. Once the sender is verified as a trusted sender (because this process succeeds), the independent compute core processes the message. This will include storing the message content of the message at the location in the secure data storage device specified by the data location field (408, FIG. 4) of the message.

The independent compute core will then increment (720) its message identification value. Consequently, the message identification value of the independent compute core should continue to match that of the BIOS because, as described above, the BIOS increment its message identification value as part of the process of generating the message. Note that any inconsistency in message identifier will be interpreted by the independent compute core as an attack. Thus, in any case where the message identifier does not match the expected value, the message is discarded by the independent compute core.

Figure 8:
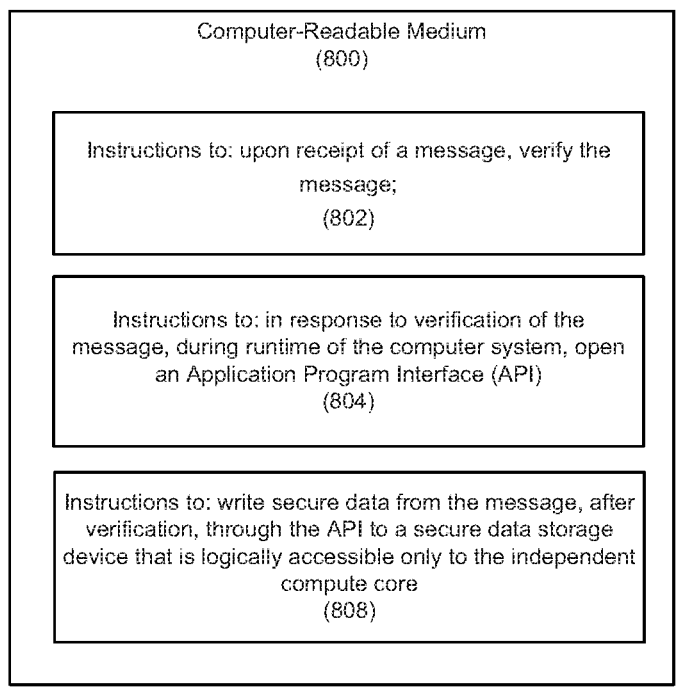
FIG. 8 is a diagram of a non-transitory computer-readable medium with instructions that, when executed by an independent compute core, cause the controller to process is a message from the BIOS of a host machine for writing data, during runtime, to a secure data storage device consistent with the disclosed implementations.

FIG. 8 is a diagram of a non-transitory computer-readable medium with instructions that, when executed by an independent compute core, cause the controller to process is a message from the BIOS of a host machine for writing data, during runtime, to a secure data storage device consistent with the disclosed implementations. As shown in FIG. 8, the non-transitory computer-readable medium (800) includes instructions that, when executed by an independent compute core of a computer system, cause the independent compute core to: upon receipt of a message, verify (802) the message;

in response to verification of the message, during runtime of the computer system, open (804) an Application Program Interface (API); and write (80) secure data from the message, after verification, through the API to a secure data storage device that is logically accessible only to the independent compute core.

It should be noted here that the non-transitory computer-readable medium does not exclude volatile memory devices, such as RAM, which are considered non-transitory computer-readable media.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A computer system comprising:
    a main system processor;
    a Basic Input/Output System (BIOS) comprising BIOS firmware;
    an isolated secure data storage device that comprises a backup copy of the BIOS firmware; and
    an independent compute core comprising a processor that is a separate entity from the main system processor of the computer system, the independent compute core having exclusive access to the isolated secure data storage device, the independent compute core programmed to verify the BIOS firmware prior to use of the BIOS firmware in booting the computer system; and
    wherein the isolated secure data storage device is to store data accessible only to the independent compute core; and
    wherein the independent compute core is to open an Application Program Interface (API) during runtime of the computer system in response to receiving a verified message containing secure data to be written to the secure data storage device and to use the API to write the secure data to the secure data storage device.

2. The computer system of claim 1, further comprising a flag of the API, the independent compute core to selectively set the flag to an open or closed state, wherein writing secure data to the secure data storage device can only occur when the flag is an open state.

3. The computer system of claim 2, wherein the independent compute core is to change the flag from the closed state to the open state when opening the API in response to receiving the verified message containing secure data to be written to the secure data storage device.

4. The computer system of claim 1, further comprising multiple APIs operable by the independent compute core, each API providing exclusive access to a different location of the secure data storage device.

5. The computer system of claim 1, the independent compute core further to verify a received message containing data to be written to the secure data storage device using all of a shared secret, a message identification value and a keyed-hash message authentication code (HMAC).

6. The computer system of claim 1, the independent compute core further to write data from the verified message to the secure data storage device through the API during runtime of the computer system.

7. The computer system of claim 1, wherein the independent compute core is further programmed to update, through the API, the backup copy of the BIOS firmware for the computer system located in the isolated secure data storage device.

8. The computer system of claim 1, wherein the verified message comprises seven fields: a hash message authentication code (HMAC), a message identification value, a shared secret identifier, a data location, a hash algorithm identifier, a message length and a message content field.

9. The computer system of claim 1, wherein the independent compute core comprises a message identification value that is incremented by the independent compute core upon verification of the verified message.

10. A method comprising:
    in a computer system having a main system processor and a Basic Input/Output System (BIOS) comprising BIOS firmware, securing a backup copy of the BIOS firmware in a secure data storage that is accessible only to a BIOS watchdog system comprising an independent compute core, wherein the independent compute core comprises a processor that is a separate entity from the main system processor of the computer system, the independent compute core having exclusive access to the secure data storage that comprises the backup copy of the BIOS firmware; and
    during runtime of a computer system, opening an Application Program Interface (API) with the independent compute core in response to receiving a verified message containing secure data to be written to the secure data storage device; and
    writing the secure data to the secure data storage device through the API.

11. The method of claim 10, further comprising updating the backup copy of the BIOS firmware in the secure data storage device based on the secure data of the verified message through the API.

12. The method of claim 10, further comprising verifying the received message prior to opening the API by checking whether a message length of the received message exceeds an allowed maximum.

13. The method of claim 10, further comprising verifying the received message prior to opening the API by:
    preparing a keyed-hash message authentication code (HMAC) of data in the received message using an identified hash algorithm and a shared secret; and
    comparing the HMAC to an HMAC containing in the received message.

14. The method of claim 13, wherein preparing the HMAC comprises hashing all of a message identification value, data location value, hash algorithm identification, message length value and contents of the message field from the received message.

15. The method of claim 13, further comprising establishing the shared secret by:
    transmitting to a Basic Input Output System (BIOS) of a host computer system a current message identification value; and, in response,
    receiving a random number to use as the shared secret.

16. The method of claim 15, further comprising:
    storing the shared secret in a designated location of the secure data storage device; and
    closing an Application Programing Interface (API) exclusively providing write access to that designated location.

17. The method of claim 10, further comprising incrementing a message identification value in response to writing of the secure data from a verified message to the secure data storage device.

18. The method of claim 10, further comprising, after opening the API, changing a flag of the API that was set to a closed state for runtime to an open state to permit writing the secure data to the secure data storage device through the API.

19. A non-transitory computer-readable medium comprising instructions for an independent compute core of a computer system, the independent compute core comprising a processor that is a separate entity from a main system processor of the computer system, the independent compute core having exclusive access to an secure data storage device that comprises a backup copy of Basic Input/Output System (BIOS) firmware of the computer system, the instructions, when executed by the independent compute core of the computer system, cause the independent compute core to:
- upon receipt of a message, verify the message;
- in response to verification of the message, during runtime of the computer system, open an Application Program Interface (API); and
- write secure data from the message, after verification, through the API to the secure data storage device that is logically accessible only to the independent compute core.

20. The non-transitory computer-readable medium of claim 19, further comprising instruction to verify the message by:
- preparing a keyed-hash message authentication code (HMAC) of data in the message using an identified hash algorithm and a shared secret; and
- comparing the HMAC to an HMAC containing in the message.

\* \* \* \* \*